(12) United States Patent
Kim et al.

(10) Patent No.: US 12,051,544 B2
(45) Date of Patent: Jul. 30, 2024

(54) CERAMIC ELECTRONIC COMPONENT INCLUDING DIELECTRIC LAYERS HAVING DIFFERENT DIELECTRIC COMPOSITIONS

(71) Applicant: SAMSUNG ELECTRO-MECHANICS CO., LTD., Suwon-si (KR)

(72) Inventors: Tae Hyung Kim, Suwon-si (KR); Hee Sun Chun, Suwon-si (KR); Hyo Ju Lee, Suwon-si (KR); Hyeg Soon An, Suwon-si (KR); Hui Sun Park, Suwon-si (KR); Jeong Wook Seo, Suwon-si (KR); Jin Woo Kim, Suwon-si (KR); Seok Hyun Yoon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 112 days.

(21) Appl. No.: 17/569,698

(22) Filed: Jan. 6, 2022

(65) Prior Publication Data
US 2023/0126670 A1 Apr. 27, 2023

(30) Foreign Application Priority Data
Oct. 21, 2021 (KR) ........................ 10-2021-0141289

(51) Int. Cl.
*H01G 4/12* (2006.01)
*H01G 4/232* (2006.01)
(Continued)

(52) U.S. Cl.
CPC ............ *H01G 4/1227* (2013.01); *H01G 4/232* (2013.01); *H01G 4/248* (2013.01); *H01G 4/30* (2013.01)

(58) Field of Classification Search
CPC ...... H01G 4/1227; H01G 4/232; H01G 4/248; H01G 4/30; H01G 4/012; H01G 4/12;
(Continued)

(56) References Cited

U.S. PATENT DOCUMENTS

2002/0013213 A1* 1/2002 Sato ..................... H01G 4/1227
501/139
2011/0157769 A1* 6/2011 Kang ....................... H01G 4/30
501/137
(Continued)

FOREIGN PATENT DOCUMENTS

JP H10-25157 A 1/1998
KR 10-2019-0041846 A 4/2019
KR 20190060965 A * 6/2019

*Primary Examiner* — David M Sinclair
*Assistant Examiner* — Daniel M Dubuisson
(74) *Attorney, Agent, or Firm* — Morgan, Lewis & Bockius LLP

(57) ABSTRACT

A ceramic electronic component includes: a body including an active portion, including a first dielectric layer and an internal electrode, and a margin portion disposed a side surface of the active portion and including a second dielectric layer; and an external electrode disposed on the body and connected to the internal electrode. The first and second dielectric layers have different dielectric compositions. The first dielectric layer includes tin (Sn) and dysprosium (Dy). The second dielectric layer includes magnesium (Mg).

19 Claims, 8 Drawing Sheets

(51) Int. Cl.
*H01G 4/248* (2006.01)
*H01G 4/30* (2006.01)

(58) Field of Classification Search
CPC .. H01G 4/1209; H01G 4/1218; H01G 4/1245; H01G 4/224
See application file for complete search history.

(56) References Cited

U.S. PATENT DOCUMENTS

| | | | |
|---|---|---|---|
| 2013/0162100 A1* | 6/2013 | Kang | B32B 18/00 |
| | | | 501/87 |
| 2015/0170838 A1* | 6/2015 | Suzuki | H01G 4/30 |
| | | | 29/25.03 |
| 2017/0040111 A1* | 2/2017 | Kim | H01G 4/224 |
| 2017/0178808 A1* | 6/2017 | Shimada | C04B 35/64 |
| 2019/0115153 A1 | 4/2019 | Park et al. | |
| 2019/0355519 A1* | 11/2019 | Taniguchi | H01G 4/232 |
| 2020/0258685 A1* | 8/2020 | Ham | C04B 35/4682 |
| 2022/0301773 A1* | 9/2022 | Hamada | H01G 4/008 |
| 2022/0319774 A1* | 10/2022 | Kato | H01G 4/012 |
| 2022/0319775 A1* | 10/2022 | Kato | H01G 4/12 |

* cited by examiner

CERAMIC ELECTRONIC COMPONENT INCLUDING DIELECTRIC LAYERS HAVING DIFFERENT DIELECTRIC COMPOSITIONS

CROSS-REFERENCE TO RELATED APPLICATION(S)

The present application claims the benefit of priority to Korean Patent Application No. 10-2021-0141289, filed on Oct. 21, 2021 in the Korean Intellectual Property Office, the entire disclosure of which is incorporated herein by reference.

TECHNICAL FIELD

The present disclosure relates to a ceramic electronic component, for example, a multilayer ceramic capacitor (MLCC).

BACKGROUND

Recently, deterioration of reliability is emerging as a critical issue due to the thinning of a dielectric material and internal electrodes for miniaturizing a ceramic electronic component. For example, as heavy reduction and high-temperature uniaxial sintering conditions are applied, mismatching between an active portion and a margin portion may occur due to a sintering behavior difference, and density of the margin portion may be reduced. When such mismatching and reduction in density of the margin portion occur, accelerated lifespan may be decreased and moisture resistance reliability may be deteriorated.

SUMMARY

An aspect of the present disclosure is to provide a ceramic electronic component having reliability improved by significantly reducing sintering mismatching of a margin portion and increasing density of the margin portion.

The present disclosure proposes various solutions. One of the proposed solutions is provide an active portion and a margin portion having different compositions. For example, a dielectric layer of the active portion may include tin (Sn) and dysprosium (Dy), and a dielectric layer of the margin portion may include magnesium (Mg).

According to an aspect of the present disclosure, a ceramic electronic component includes: a body including an active portion, including a first dielectric layer and an internal electrode, and a margin portion disposed on a side surface of the active portion and including a second dielectric layer; and an external electrode disposed on the body and connected to the internal electrode. The first and second dielectric layers have different dielectric compositions. The first dielectric layer includes tin (Sn) and dysprosium (Dy). The second dielectric layer includes magnesium (Mg).

According to an aspect of the present disclosure, a ceramic electronic component includes: a body including an active portion, including a first dielectric layer and an internal electrode, and a margin portion disposed on a side surface of the active portion of the active portion in a width direction of the body and including a second dielectric layer; and an external electrode disposed on the body and connected to the internal electrode. Each of the first and second dielectric layers includes a barium titanate-based material as a main component. The first dielectric layer includes 0.5 mole to 1.5 moles of tin (Sn) and 0.6 mole to 1.0 mole of dysprosium (Dy) per 100 moles of the barium titanate-based material. The second dielectric layer includes 1.5 mole to 2.5 moles of magnesium (Mg) per 100 moles of the barium titanate-based material.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
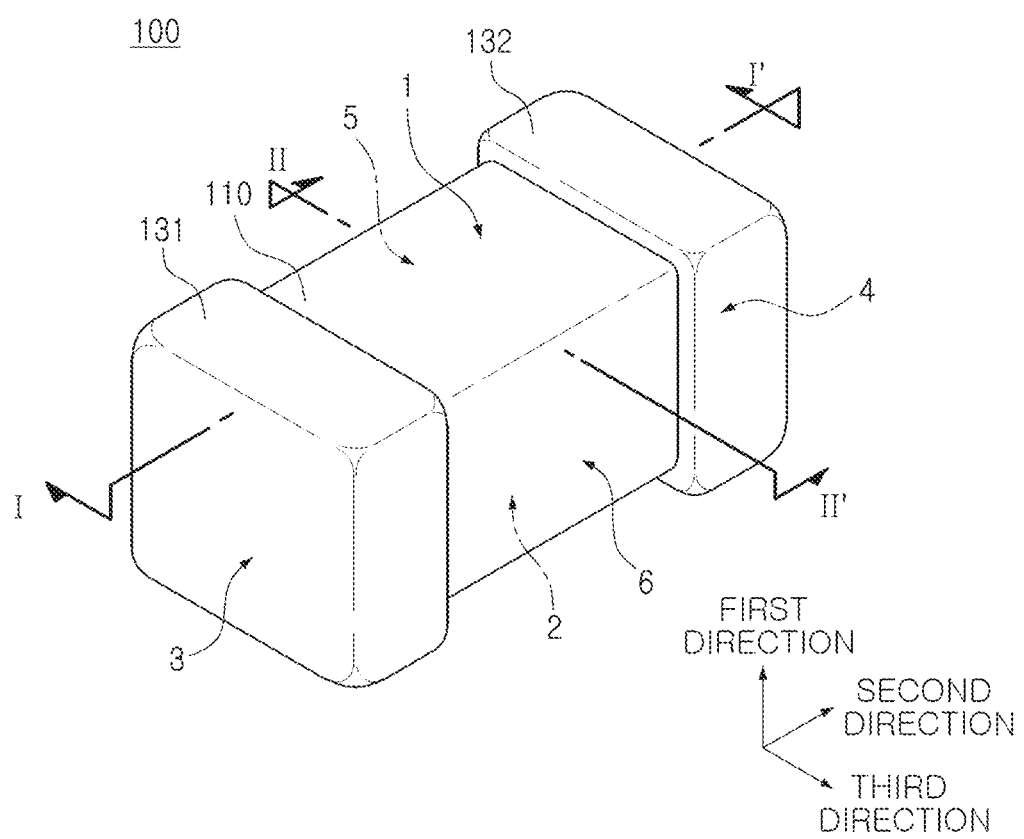
FIG. 1 is a schematic perspective view of a ceramic electronic component according to an example.

Hereinafter, exemplary embodiments in the present disclosure will be described with reference to the accompanying drawings. In the accompanying drawings, shapes, sizes, and the like, of components, may be exaggerated or omitted for clarity.

In the drawings, a first direction may be defined as a lamination direction or a thickness direction, a second direction may be defined as a length direction, and a third direction may be defined as a width direction.

FIG. 1 is a schematic perspective view of a ceramic electronic component according to an example.

Figure 2:
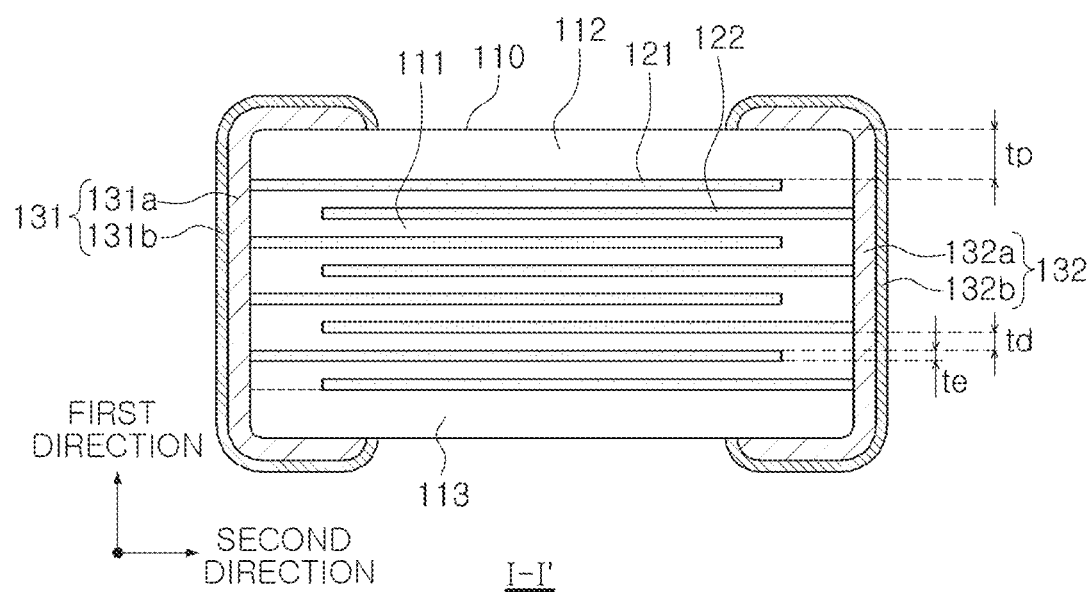
FIG. 2 is a schematic cross-sectional view taken along line I-I' of FIG. 1.

FIG. 2 is a schematic cross-sectional view taken along line I-I' of FIG. 1.

Figure 3:
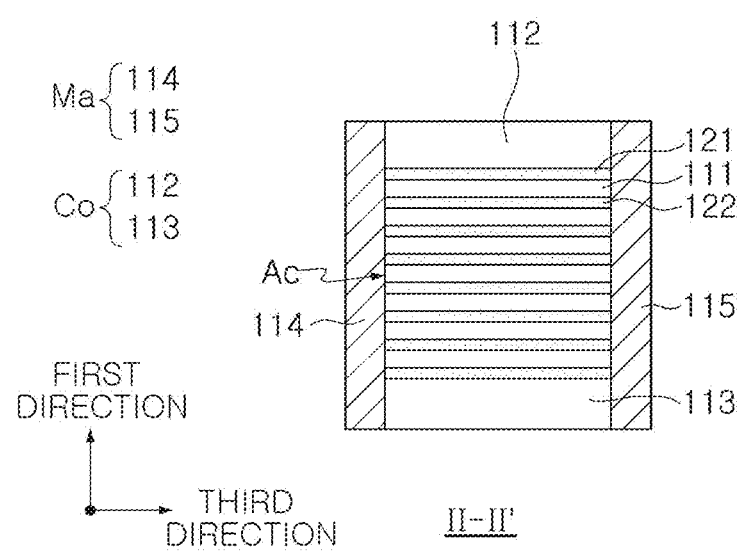
FIG. 3 is a schematic cross-sectional view taken along line II-II' of FIG. 1.

FIG. 3 is a schematic cross-sectional view taken along line II-II' of FIG. 1.

Referring to the drawings, a ceramic electronic component 100 according to an example may be a body 110, including an active portion Ac, including a first dielectric layer 111 and internal electrodes 121 and 122, and a margin portion Ma disposed on opposite side surfaces of the active portion Ac, and external electrodes 131 and 132 disposed on the body 110 and connected to internal electrodes 112 and 113. A first dielectric layer 111 and a second dielectric layers 114 and 115 may each include a barium titanate-based material as a main component. However, the first dielectric layer 111 and the second dielectric layers 114 and 115 may have different dielectric compositions. For example, the first dielectric layer 111 may include tin (Sn) and dysprosium (Dy), and the second dielectric layers 114 and 115 may include magnesium (Mg).

Recently, as electronic products have been reduced in size and have had multifunctionality implemented therein, electronic components have also become more compact and more highly functional, and thus, a multilayer ceramic capacitor having a small size but a high capacitance has been demanded. In order to provide a multilayer ceramic capacitor having a small size and high capacitance, it is necessary to secure a dielectric material having high dielectric characteristics and improved withstand voltage characteristics. In addition, thinning of a dielectric layer and a significant increase in an effective area of an electrode are required. However, a thickness of the dielectric layer may be locally decreased due to the thinning of the dielectric layer and a step of a margin portion. Hence, a structural design should be modified to avoid a withstand voltage decrease phenomenon caused by the local decrease in thickness.

To implement a multilayer ceramic capacitor having a small size and high capacitance while preventing a decrease in withstand voltage, separately attaching a margin portion may be taken into consideration. For example, a method of exposing the internal electrode in a width direction of the body to significantly increase an area of the internal electrode in the width direction through a marginless design and separately attaching a side margin portion to the exposed surface of the electrode in the width direction, prior to sintering, after such a chip is manufactured to complete a multilayer ceramic capacitor, has been applied when the multilayer ceramic capacitor is manufactured.

However, when a multilayer ceramic capacitor is manufactured, a dielectric composition for forming a side margin portion was not differentiated from a dielectric composition of a ceramic body, but the dielectric composition of the ceramic body was used as is. Therefore, a physical packing density of a dielectric material in the side margin portion is low, so that density of the side margin portion may be decreased. In addition, sintering behavior mismatching between the dielectric material of the side margin portion and the internal electrode may occur during the sintering. When such mismatching and a decrease in densification of the margin portion occur, accelerated lifespan may be reduced and moisture resistance reliability may be deteriorated.

Accordingly, it may be taken into consideration that a dielectric composition for forming a side margin portion is provided to be different from a dielectric composition of a ceramic body to improve reliability. For example, a method of changing abase material of a margin portion or adjusting a molar ratio of barium (Ba) and titanium (Ti) may be taken into consideration. However, in the method of changing a base material of a margin portion, a non-grain growth type base material may be used to improve withstand voltage characteristics and reliability characteristics, whereas grain growth may be suppressed but the density may be decreased to deteriorate moisture resistance reliability. In addition, in the method of adjusting a molar ratio, density of a margin portion may be secured but, when the molar ratio is adjusted to secure only the density under the same sintering condition, grains may be overgrown to cause grain growth of an active dielectric material proximate to a margin. In addition, characteristics may be deteriorated due to chip deformation caused by mismatching of sintering behavior.

Meanwhile, in the electronic component according to an example, compositions of elements included in the dielectric materials of the active portion Ac and the margin portion Ma are different from each other. For example, the first dielectric layer 111 and the second dielectric layers 114 and 115 each include a barium titanate-based material as a main component, and the first dielectric layer 111 may include tin (Sn) and dysprosium (Dy) and the second dielectric layers 114 and 115 may include magnesium (Mg).

For example, magnesium (Mg) ensuring density through formation of a liquid phase while suppressing grain growth of grains may be included in a predetermined amount in the dielectric composition of the margin portion Ma. In this case, grain growth may be suppressed by magnesium (Mg) to cause a difference in sintering driving force with the dielectric material of the active portion Ac, so that mismatching may occur. Therefore, a predetermined amount of tin (Sn), suppressing grain growth, may be included in the active portion Ac. In addition, a predetermined amount of dysprosium (Dy), substituted in an A-site of the base material of the active portion Ac such that oxygen beam site defects may be reduced to improve reliability, may be included in the active portion Ac.

When a small amount of magnesium (Mg) is added to the margin portion Ma, the density of the margin portion Ma may be insufficient, so that moisture resistance reliability may be deteriorated. In contrast, when an excessive amount of magnesium (Mg) is, characteristics may deteriorate due to formation of a secondary phase and diffusion into the active portion Ac. Therefore, it may be necessary to appropriately adjust a content of added magnesium (Mg). For example, the second dielectric layers 114 and 115 of the margin portion Ma may include 1.5 moles to 2.5 moles of magnesium (Mg) per 100 moles of a barium titanate-based material.

In addition, when a significantly small amount tin (Sn) is included in the dielectric composition of the active portion Ac, a ratio of dysprosium (Dy) substituted in a B-site may be relatively increased to reduce a reliability improvement effect. In contrast, when a significantly large amount of tin (Sn) is included, the number of sites which may be doped with other elements may be decreased. Since the excessive amount of magnesium (Mg) causes difficulty in substitution of dysprosium (Dy) and diffusion into a base material, the effect of improving reliability may be reduced. Accordingly, an appropriate ratio of tin (Sn) to dysprosium (Dy) may be required. For example, the first dielectric layer 111 of the active portion (Ac) may include 0.5 mole to 1.5 moles of tin (Sn) and 0.6 mole to 1.0 mole of dysprosium (Dy) per 100 moles of the barium titanate-based material. In this case, a molar ratio (Dy/Sn) may be about 0.6 to 1.0.

The first dielectric layer 111 of the active portion Ac may further include at least one of yttrium (Y), terbium (Tb), holmium (Ho), erbium (Er), gadolinium (Gd), cerium (Ce), samarium (Sm), lanthanum (La), neodymium (Nd), and praseodymium (Pr), as a subcomponent. The first dielectric layer 111 of the active portion Ac may further include at least one of manganese (Mn) and vanadium (V), as a subcomponent. The first dielectric layer 111 of the active portion Ac may further include at least one of silicon (Si) and aluminum (Al), as a subcomponent. Reliability may be more effectively improved through such subcomponents. Similarly, the second dielectric layers 114 and 115 of the margin portion Ma may further include a subcomponent at least one of silicon (Si) and aluminum (Al).

The compositions of the dielectric layers 111, 112, 113, 114, and 115 may be measured through transmission electron microscopy-energy dispersive spectrometer (TEM-EDS) elemental analysis. For example, after focused ion beam (FIB) sampling for TEM analysis of a sample chip, type and content of included elements may be confirmed through TEM-EDS mapping. Then, to confirm a ratio corresponding to a base material such as barium titanate among the analyzed elements, an analysis ratio of a corresponding element may be divided by an analysis ratio of titanium (Ti) to confirm how much mole % of the base material includes the corresponding material.

Hereinafter, respective components included in the ceramic electronic component 100 according to an example will be described in more detail.

A specific shape of the body 110 is not limited, but may be an overall hexahedral shape or a shape similar to the hexahedral shape. Although the body 110 does not have a hexahedral shape having perfectly straight lines due to shrinkage of ceramic powder particles included in the body 110 in a sintering process, the body 110 may have a substantially hexahedral shape. As necessary, an angular portion of the body 110, for example, a corner portion may be polished to be rounded by a polishing process, or the like.

The body 110 may have a first surface 1 and a second surface 2 opposing each other in a first direction, a third surface 3 and a fourth surface 4 connected to the first and second surfaces 1 and 2 and opposing each other in a second direction, and a fifth surface 5 and a sixth surface 6 connected to the first and second surfaces 1 and 2 as well as to the third and fourth surfaces 3 and 4 and opposing each other in a third direction.

In the body 110, dielectric layers 111 and internal electrodes 121 and 122 may be alternately laminated. A plurality of dielectric layers 111 forming the body 110 may be in a sintered state, and adjacent dielectric layers 111 may be integrated with each other so that boundaries therebetween are not readily apparent without using a scanning electron microscope (SEM).

The dielectric layer 111 may be formed by sintering a ceramic green sheet including ceramic powder particles, an organic solvent, and an organic binder. The ceramic powder particles are a material having a high-k dielectric constant. As the ceramic powder particles, a barium titanate (BaTiO$_3$)-based material, a strontium titanate (SrTiO$_3$)-based material, or the like and, in detail, the above-described barium titanate-based material may be used.

A thickness td of the dielectric layer 111 does not need to be limited. However, in general, when the dielectric layer 111 is formed to have a low thickness of less than 0.6 μm, in particular, when the thickness of the dielectric layer 111 is 0.4 μm or less, reliability may be deteriorated. Meanwhile, in the present disclosure, even when the dielectric layer 111 has a thickness of 0.4 μm or less, improved reliability may be secured as described above. Accordingly, when the thickness of the dielectric layer 111 is 0.4 μm or less, a reliability improvement effect according to the present disclosure may be more significant, and miniaturization and high capacitance of the ceramic electronic component may be more easily achieved.

The thickness td of the dielectric layer 111 may refer to an average thickness of the dielectric layer 111 disposed between the internal electrodes 121 and 122. The average thickness of the dielectric layer 111 may be measured by scanning an image of a cross-section of the body 110 in the length and thickness directions (L-T) using a scanning electron microscope (SEM) with a magnification of 10,000 times. For example, the average value may be measured by measuring thicknesses at 30 points of one dielectric layer at equal intervals in the length direction in the scanned image. The 30 points at equal intervals may be designated in an active portion Ac. In addition, when the average value is measured by extending the measurement of the average value to 10 dielectric layers 111, the average thickness of the dielectric layers 111 may be further generalized.

The body 110 may include an active portion Ac in which capacitance is formed by including a plurality of first internal electrodes 121 and second internal electrodes 122 disposed to oppose each other with the dielectric layer 111 interposed therebetween. The active portion Ac may be a portion contributing to formation of capacitance of the capacitor, and may be formed by repeatedly laminating a plurality of first internal electrodes 121 and second internal electrodes 122 with a dielectric layer 111 interposed therebetween.

The body 110 may further include a margin portion Ma disposed on opposite side surfaces of the active portion Ac in a width direction. The margin portion Ma may include a 2-1-th dielectric layer 114 providing the fifth surface 5 of the body 110 and a 2-2-th dielectric layer 115 providing the sixth surface 6. The margin portion Ma may refer to a region between opposite ends of the internal electrodes 121 and 122 and an interface of the body 110 in a cross-section of the body 110, taken in a width-thickness direction. The margin portion Ma may basically serve to prevent damage, caused by physical or chemical stress, to the internal electrodes 121 and 122. The margin portion Ma may be manufactured separately from the active portion Ac and may then be attached to the active portion Ac. For example, the margin portion Ma may be formed by cutting a laminate such that the internal electrodes 121 and 122 are exposed to opposite side surfaces of the active portion Ac in the width direction and laminating a separately manufactured single dielectric layer or two or more dielectric layers to opposite side surfaces of the active portion Ac in a width direction.

The body 110 may further include a cover portion Co disposed on an upper surface and a lower surface of the active portion Ac, based on a thickness direction. The margin portion Ma may be disposed to extend upwardly of opposite sides surfaces of the cover portion Co in a width direction. The cover portion Co may include third dielectric layers 112 and 113 having the same dielectric composition as the above-described first dielectric layer 111. For example, the cover portion Co may include a 3-1-th dielectric layer 112, providing the first surface 1 of the body 110, and a 3-2-th dielectric layer 112 providing the second surface 2 of the body 110. The cover portion Co may basically serve to prevent damage, caused by physical or chemical stress, to the internal electrodes 121 and 122. The cover portion Co may be formed by laminating a single dielectric layer or two or more dielectric layers on upper and lower surfaces of the active portion Ac in the thickness direction, respectively. The cover portion Co may not include the internal electrodes 121 and 122. The thickness of the cover portion Co does not need to be limited. However, to more easily achieve miniaturization and high capacitance of the ceramic electronic component, a thickness tp of the cover portion Co may be 20 μm or less.

The internal electrodes 121 and 122 may be alternately laminated with the dielectric layer 111. The internal electrodes 121 and 122 may include a plurality of first internal electrodes 121 and second internal electrodes 122. The plurality of first internal electrodes 121 and the plurality of second internal electrodes 122 may be alternately disposed to face each other with respective dielectric layers 111 interposed therebetween, and may be exposed to the third and fourth surfaces 3 and 4, respectively. For example, each of the plurality of first internal electrodes 121 may be spaced apart from the fourth surface 4 to be exposed through the third surface 3. In addition, each of the plurality of second internal electrodes 122 may be spaced apart from the third surface 3 to be exposed through the fourth surface 4. The plurality of first internal electrodes 121 and second internal electrodes 122 may be electrically insulated from each other by a dielectric layer 111 disposed therebetween.

The internal electrodes 121 and 122 may be formed by a conductive paste including a conductive metal. For example, the internal electrodes 121 and 122 may be printed by printing a conductive paste on the ceramic green sheet, forming the dielectric layer 111, through a printing method such as a screen printing method or a gravure printing method. When the ceramic green sheets on which the internal electrodes 121 and 122 are printed are alternately laminated and sintered, the active portion Ac of the body 110 may be formed. The conductive metal may include, but is not limited to, nickel (Ni), copper (Cu), palladium (Pd), silver (Ag), gold (Au), platinum (Pt), tin (Sn), tungsten (W), titanium (Ti), and/or alloys thereof.

A thickness to of the internal electrodes 121 and 122 does not need to be limited. However, in general, when the internal electrodes 121 and 122 are formed to have a low thickness of less than 0.6 µm, in particular, when the thickness of the internal electrodes 121 and 122 was 0.4 µm or less, there was a probability that reliability would be deteriorated. Meanwhile, in the present disclosure, even when the thickness of the internal electrodes 121 and 122 is 0.4 µm or less, improved reliability may be secured as described above. Accordingly, when the thickness of the internal electrodes 121 and 122 is 0.4 µm or less, a reliability improvement effect according to the present disclosure may be more significant, and miniaturization and high capacitance of the ceramic electronic component may be more easily achieved.

The thickness to of the internal electrodes 121 and 122 may refer to an average thickness of the internal electrodes 121 and 122. The average thickness of the internal electrodes 121 and 122 may be measured by scanning an image of a cross-section of the body 110 in the length and thickness directions (L-T) using a scanning electron microscope (SEM) with a magnification of 10,000 times. For example, the average value may be measured by measuring thicknesses at 30 points of one dielectric layer at equal intervals in the length direction in the scanned image. The 30 points at equal intervals may be designated in an active portion Ac. In addition, when the average value is measured by extending the measurement of the average value to 10 dielectric layers 111, the average thickness of the dielectric layers 111 may be further generalized.

The external electrodes 131 and 132 may be disposed on the third surface 3 and the fourth surface 4 of the body 110 in such a manner that a portion thereof extends to each of the first surface 1, the second surface 2, the fifth surface 5, and the sixth surface 6. The external electrodes 131 and 132 may include a first external electrode 131 and a second external electrode 132, respectively connected to the plurality of first internal electrodes 121 and the plurality of second internal electrode 122. The first external electrode 131 may be disposed on the third surface 3 of the body 110 in such a manner that a portion thereof extends to each of the first surface 1, the second surface 2, the fifth surface 5, and the sixth surface of the body 110. The second external electrode 132 may be disposed on the fourth surface 4 of the body 110 in such a manner that a portion thereof extends to each of the first surface 1, the second surface 2, the fifth surface 5, and the sixth surface 6. Each of the faces 6 may partly extend. In the drawings, the ceramic electronic component 100 is illustrated as including two external electrodes 131 and 132, but the number and shape of the external electrodes 131 and 132 may vary depending on a shape of the internal electrodes 121 and 122, or other purposes.

The external electrodes 131 and 132 may be formed of any material, as long as it has electrical conductivity, such as a metal. A specific material may be determined in consideration of electrical characteristics and structural stability. Furthermore, the external electrodes 131 and 132 may have a multilayer structure. For example, the external electrodes 131 and 132 may include electrode layers 131a and 132a, disposed on the body 110, and plating layers 131b and 132b formed on the electrode layers 131a and 132a.

Each of the electrode layers 131a and 132a may be, for example, a firing electrode including a conductive metal and glass, or a resin-based electrode including a conductive metal and a resin. In addition, the electrode layers 131a and 132a may have a form in which a firing electrode and a resin-based electrode are sequentially formed on the body 110. In addition, the electrode layers 131a and 132a may be formed in a manner of transferring a sheet including a conductive metal onto the body 110 or transferring a sheet including a conductive metal onto the firing electrode. As the conductive metal included in the electrode layers 131a and 132a, a material having improved electrical conductivity may be used, and the material is not limited. For example, the conductive metal may include copper (Cu), nickel (Ni), palladium (Pd), platinum (Pt), gold (Au), silver (Ag), lead (Pb) and/or alloys thereof.

The plating layers 131b and 132b may serve to improve mounting characteristics. The plating layers 131b and 132b is not limited in type, and may be a plating layer including nickel (Ni), tin (Sn), palladium (Pd) and/or alloys thereof, or may include a plurality of layers. The plating layers 131b and 132b may be, for example, a nickel (Ni) plating layer or a tin (Sn) plating layer, or may be in a form which a nickel (Ni) plating layer and a tin (Sn) plating layer are sequentially formed on the electrode layers 131a and 132a. In addition, the plating layers 131b and 132b may include a plurality of nickel (Ni) plating layers and/or a plurality of tin (Sn) plating layers.

A size of the ceramic electronic component 100 does not need to be limited. However, to achieve miniaturization and high capacitance at the same time, the thicknesses of the dielectric layer 111 and the internal electrodes 121 and 122 should be reduced to increase the number of laminated layers, so that in ceramic electronic component 100 which should have a size of 1005 (length×width: 1.0 mm×0.5 mm) or less, the reliability improvement effect according to the present disclosure may be more significant. Accordingly, in consideration of manufacturing errors and sizes of the external electrodes 131 and 132, when the ceramic electronic component 100 has a length of 1.1 mm or less and a width of 0.55 mm or less, the reliability improvement effect may be more significant. The length of the ceramic electronic component 100 may refer to a size in the length direction, and the width of the ceramic electronic component 100 may refer to a size in the width direction.

Figure 4:
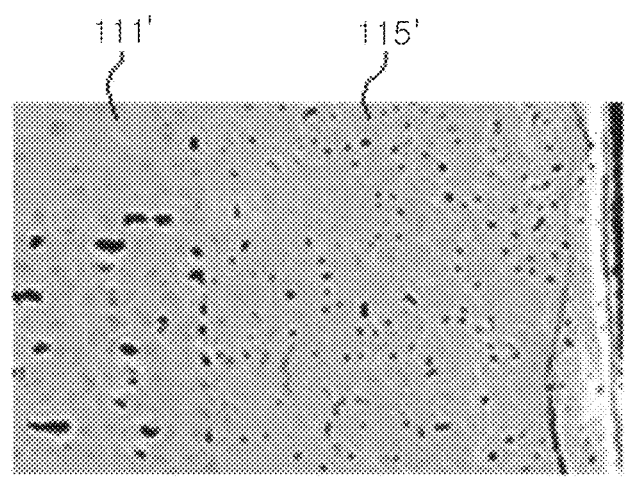
FIG. 4 is a scanning electron microscope (SEM) image illustrating a microstructure of a margin portion when an active portion and the margin portion have the same composition.

FIG. 4 is a scanning electron microscope (SEM) image illustrating a microstructure of a margin portion when an active portion and the margin portion have the same composition.

Figure 5:
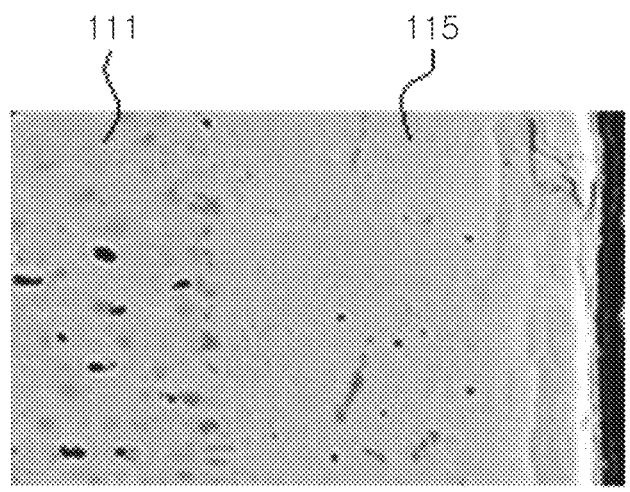
FIG. 5 is a cross-sectional SEM image illustrating a microstructure of a margin portion when an active portion and the margin portion have different compositions according to the present disclosure.

FIG. 5 is a cross-sectional SEM image illustrating a microstructure of a margin portion when an active portion and the margin portion have different compositions according to the present disclosure.

Referring to the drawings, SEM analysis was performed to confirm the density of the margin when compositions of the active portion and the margin portion were the same and when the compositions thereof were different according to the present disclosure, and a densification value was measured using the confirmed density.

For example, each sample chip was polished to a point corresponding to half of a cross-section taken in a width-thickness direction to expose an analysis position, and measurement was performed after removing impurities in a polishing process through ion milling. Such prepared specimens were subjected to SEM analysis under conditions of an acceleration voltage of 3 kV and a working distance (WD) of 3.6 mm. A margin region disposed in the center of a chip was measured, and an image was measured such that about 20 layers, including dielectric layers and internal electrodes in an active region, were visible and an edge of the margin portion is included. In addition, the densification value was measured. The measurement of the densification value was performed using a Sigma Scan Program.

As a result of the measurement, when compositions of a dielectric layer 111' of an active portion and a dielectric layer 115' of a margin portion were the same as in FIG. 4, density was about 97.4%. When compositions of a dielectric layer 111 of an active portion and a dielectric layer 115 of a margin portion were different from each other as in FIG. 5, the density was improved to be about 99.8%.

Figure 7:
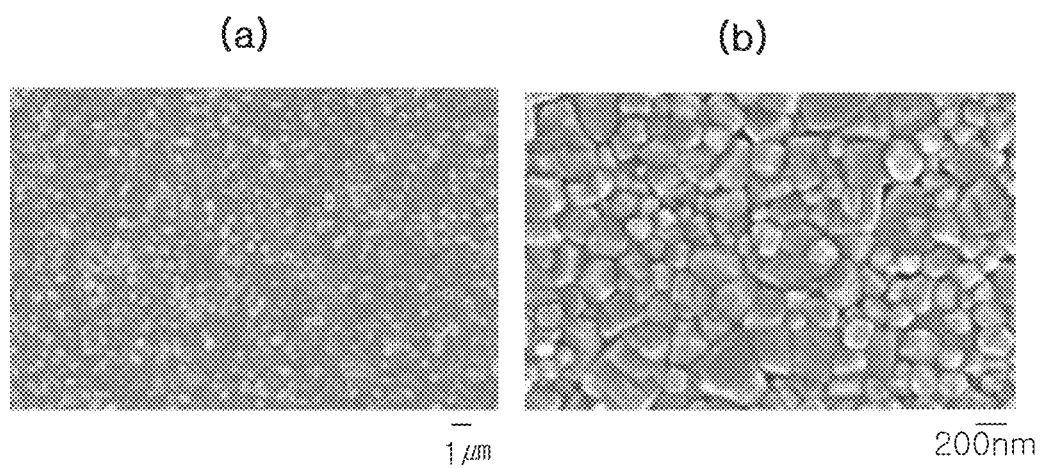
FIG. 7 is a cross-sectional SEM image illustrating a microstructure of a margin portion when a content of magnesium (Mg) of the margin portion satisfies a range proposed in the present disclosure.

FIG. 7 is a cross-sectional SEM image illustrating a microstructure of a margin portion when a content of magnesium (Mg) of the margin portion satisfies a range proposed in the present disclosure.

Figure 8:
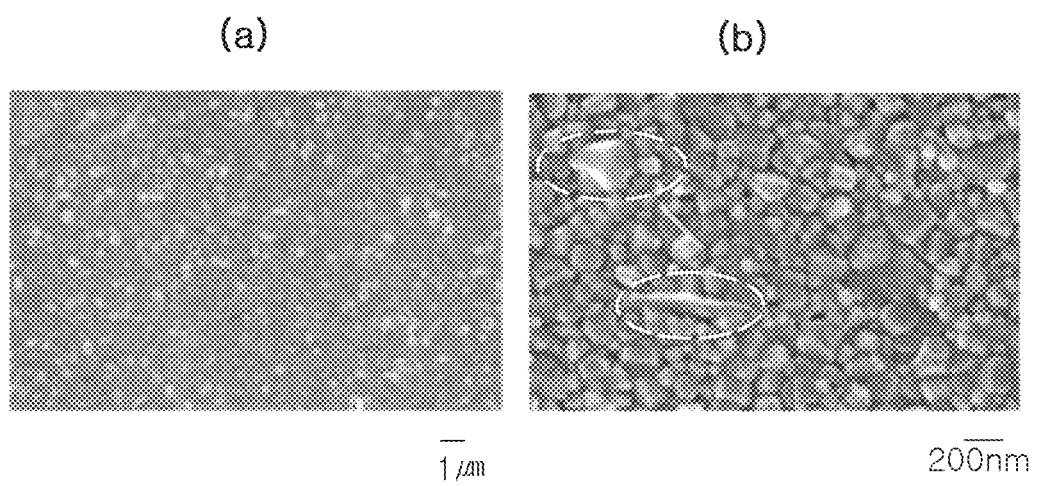
FIG. 8 is a cross-sectional SEM image illustrating a microstructure of a margin portion when a content of magnesium (Mg) of the margin portion is higher than a range proposed in the present disclosure.

FIG. 8 is a cross-sectional SEM image illustrating a microstructure of a margin portion when a content of magnesium (Mg) of the margin portion is higher than a range proposed in the present disclosure.

Referring to the drawings, compositions of an active portion and a margin portion were different as proposed in the present disclosure but, while varying a content of magnesium (Mg) included in a dielectric layer of the margin portion, SEM analysis was performed to confirm a microstructure of the margin portion. Specimen preparation for the SEM analysis is the same as described above.

Figure 6:
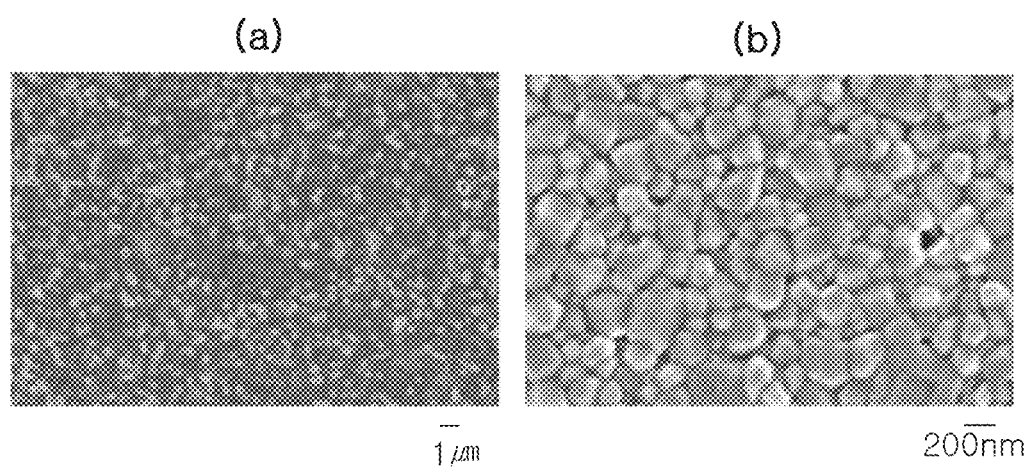
FIG. 6 is a cross-sectional SEM image illustrating a microstructure of a margin portion when a content of magnesium (Mg) of the margin portion is lower than a range proposed in the present disclosure.

As illustrated in FIG. 6, when a small amount of magnesium (Mg) is added in a content of less than 1.5 mol %, the density of the margin portion may be insufficient. In this case, deterioration of moisture resistance reliability may be problematic. In addition, as illustrated in FIG. 8, when an excessive amount of magnesium (Mg) is added in a content of 2.5 mol %, generation of a second phase and diffusion into a dielectric layer of an active portion may occur, and thus, characteristics may be deteriorated. On the other hand, as illustrated in FIG. 7, when the content of magnesium (Mg) is about 1.5 mol % to 2.5 mol %, it can be seen that sufficient density may be secured while suppressing grain growth of grains.

EXPERIMENTAL EXAMPLE

After preparing a dielectric composition including a barium titanate-based base material as a main component and including tin (Sn), dysprosium (Dy), and the like, a conductive paste for an internal electrode including nickel (Ni) was applied to a ceramic green sheet including a dielectric composition to form an internal electrode pattern. Then, a laminate was obtained by laminating ceramic green sheets on which internal electrode patterns were formed. Then, the laminate was cut in units of chips to expose an internal electrode in a width direction, so that a marginless green chip was manufactured.

In addition, after preparing a dielectric composition including a barium titanate-based base material as a main component and including magnesium (Mg), a molded sheet was manufactured. Then, the molded sheet was cut to about 5 cm×5 cm to fit a size of the margin portion.

Then, the molded sheets were attached to both surfaces of the chip by applying a predetermined temperature and a predetermined pressure under conditions in which deformation of a chip was significantly reduced, and thus, various ceramic capacitor specimens having a size of 0603 (width× length×height: 0.6 mm×0.3 mm×0.3 mm) were prepared. In dielectric compositions of an active portion and a margin portion of each of the prepared specimens, a content and a molar ratio of a main composition associated with the present disclosure are listed in Table 1. The content of the main composition may be a molar content per 100 moles of the barium titanate-based base material.

The prepared specimens were subjected to a calcination process at 400° C. or less in a nitrogen atmosphere, and then sintered at a calcination temperature of 1200° C. or less at hydrogen concentration of 0.5% $H_2$ or less. Then, accelerated lifespan evaluation moisture resistance reliability was evaluated.

Dielectric compositions of the specimens were measured through the above-described TEM-EDS elemental analysis. For example, to perform TEM analysis of a sample chip, after FIB sampling, types and contents of included element were measured through TEM-EDS mapping. Then, to measure a ratio corresponding to a base material such as barium titanate among the analyzed elements, an analysis ratio of a corresponding element was divided by an analysis ratio of titanium (Ti) to measure how much mole % of the base material includes the corresponding material.

Accelerated lifespan evaluation and moisture resistance are evaluation items for confirming reliability required for products, and a failure rate of each product was evaluated under a temperature, a voltage, and humidity required for each product. In the case of accelerated lifespan evaluation, a failure rate was evaluated by applying severe evaluation conditions, calculated through an accelerated lifespan equation, to evaluate a lifespan at conventionally required temperature and voltage within a small amount of time. In the case of moisture resistance reliability, a failure rate was evaluated at required temperature, voltage, and humidity. The accelerated lifespan evaluation was measured in three stages under conditions of 85° C./6.3V/1 h, 85° C./7.56V/ 2.5 h, and 105° C./7.56V/2.5 h, and the moisture resistance reliability was measured under a condition of 85° C./RH85%/6.3V/1 h. A case in which among 400 specimen samples, even one specimen sample failed was represented by X, and a case in which no specimen sample failed was represented by O.

TABLE 1

| | Active Portion | | | Margin Portion | Accelerated Lifespan Evaluation | Moisture Resistance Reliability |
|---|---|---|---|---|---|---|
| | Content of Sn | Content of Dy | Dy/Sn | Content of Mg | | |
| 1 | 0.5 | 0.6 | 1.2 | 2 | X | X |
| 2 | 0.5 | 0.8 | 1.6 | 2 | X | X |
| 3 | 1 | 0.6 | 0.6 | 1 | O | X |
| 4 | 1 | 0.8 | 0.8 | 1 | X | X |
| 5 | 1 | 1 | 1 | 1 | O | X |
| 6 | 1 | 0.6 | 0.6 | 2 | O | O |
| 7 | 1 | 0.8 | 0.8 | 2 | O | O |
| 8 | 1 | 1 | 1 | 2 | O | O |

TABLE 1-continued

| | Active Portion | | | Margin Portion | Accelerated | Moisture |
| | Content of Sn | Content of Dy | Dy/Sn | Content of Mg | Lifespan Evaluation | Resistance Reliability |
|---|---|---|---|---|---|---|
| 9 | 1.5 | 0.6 | 0.4 | 2 | X | ○ |
| 10 | 1.5 | 0.8 | 0.53 | 2 | X | X |
| 11 | 0.25 | 0.8 | 3.2 | 2 | X | X |
| 12 | 2 | 0.8 | 0.4 | 2 | X | X |
| 13 | 1 | 0.5 | 0.5 | 2 | X | X |
| 14 | 1 | 1.2 | 1.2 | 2 | X | ○ |

Referring to Table 1, as in Experimental Examples 6 to 8, when a dielectric layer of an active portion includes 0.5 mole % to 1.5 mole % of tin (Sn), and includes 0.6 mol % to 1.0 mol % of dysprosium (Dy) and a molar ratio thereof satisfies 0.6 to 1.0, and when a dielectric layer of a margin includes 1.5 mole % to 2.5 mole % of magnesium (Mg), it can be seen that accelerated lifespan evaluation and moisture reliability evaluation results are particularly excellent. On the other hand, in the case of the other experimental examples which do not satisfy at least some of the above-mentioned conditions, it can be seen that at least one failure may occur in the accelerated lifespan evaluation and/or the wet reliability evaluation.

In the present disclosure, a multilayer ceramic capacitor has been described as a ceramic electronic component. However, the present disclosure is not limited thereto and may also be applied to other types of ceramic electronic component such as an inductor, a piezoelectric element, a varistor, a thermistor, and the like.

As described above, a ceramic electronic component having reliability improved by significantly reducing sintering mismatching and increasing density of the margin portion may be provided.

In the present disclosure, the terms "lower side", "lower portion", "lower surface," and the like, have been used to indicate a direction toward a mounted surface of the electronic component package in relation to cross sections of the drawings, the terms "upper side", "upper portion", "upper surface," and the like, have been used to indicate an opposite direction to the direction indicated by the terms "lower side", "lower portion", "lower surface," and the like. However, these directions are defined for convenience of explanation only, and the claims are not particularly limited by the directions defined, as described above.

The meaning of a "connection" of a component to another component in the description includes an indirect connection through an adhesive layer as well as a direct connection between two components. In addition, "electrically connected" means including a physical connection and a physical disconnection. It can be understood that when an element is referred to as "first" and "second", the element is not limited thereby. These terms may be used only for a purpose of distinguishing the element from the other elements, and may not limit the sequence or importance of the elements. In some cases, a first element may be referred to as a second element without departing from the scope of the claims set forth herein. Similarly, a second element may also be referred to as a first element.

The term "an example embodiment" used herein does not always refer to the same example embodiment, and is provided to emphasize a particular feature or characteristic different from that of another example embodiment. However, example embodiments provided herein are considered to be able to be implemented by being combined in whole or in part one with another. For example, one element described in a particular example embodiment, even if it is not described in another example embodiment, may be understood as a description related to another example embodiment, unless an opposite or contradictory description is provided therein.

Terms used herein are used only in order to describe an example embodiment rather than to limit the present disclosure. In this case, singular forms include plural forms unless necessarily interpreted otherwise, based on a particular context.

While exemplary embodiments have been shown and described above, it will be apparent to those skilled in the art that modifications and variations could be made without departing from the scope of the present disclosure as defined by the appended claims.

What is claimed is:

1. A ceramic electronic component comprising:
   a body including an active portion, including a first dielectric layer and an internal electrode, and a margin portion disposed on a side surface of the active portion and including a second dielectric layer; and
   an external electrode disposed on the body and connected to the internal electrode, wherein:
   the first and second dielectric layers have different dielectric compositions;
   the first dielectric layer includes tin (Sn) and dysprosium (Dy);
   the second dielectric layer includes magnesium (Mg);
   the first dielectric layer includes a smaller concentration of Mg than the second dielectric layer, and
   the second dielectric layer includes a smaller concentration of dysprosium (Dy) than the first dielectric layer.

2. The ceramic electronic component of claim 1, wherein:
   the first dielectric layer includes a barium titanate-based material as a main component.

3. The ceramic electronic component of claim 2, wherein:
   the first dielectric layer includes 0.5 mole to 1.5 moles of tin (Sn) and 0.6 mole to 1.0 mole of dysprosium (Dy) per 100 moles of the barium titanate-based material.

4. The ceramic electronic component of claim 3, wherein:
   a molar ratio of dysprosium (Dy) and tin (Sn) (Dy/Sn) is 0.6 to 1.0.

5. The ceramic electronic component of claim 1, wherein:
   the second dielectric layer includes a barium titanate-based material as a main component.

6. The ceramic electronic component of claim 5, wherein:
   the second dielectric layer includes 1.5 moles to 2.5 moles of magnesium (Mg) per 100 moles of the barium titanate-based material.

7. The ceramic electronic component of claim 1, wherein:
   the first dielectric layer further includes at least one of yttrium (Y), terbium (Tb), holmium (Ho), erbium (Er), gadolinium (Gd), cerium (Ce), samarium (Sm), lanthanum (La), neodymium (Nd), or praseodymium (Pr).

8. The ceramic electronic component of claim 1, wherein:
   the first dielectric layer further includes at least one of manganese (Mn) or vanadium (V).

9. The ceramic electronic component of claim 1, wherein:
   each of the first and second dielectric layers further includes at least one of silicon (Si) or aluminum (Al).

10. The ceramic electronic component of claim 1, wherein:
    the body further includes cover portions respectively disposed on an upper surface and a lower surface of the active portion in a thickness direction of the body and including a third dielectric layer;

the margin portion is disposed to extend to opposite side surfaces of the cover portions; and the first and third dielectric layers have the same dielectric composition.

11. The ceramic electronic component of claim 1, wherein the external electrode includes a first external electrode and a second external electrode, respectively disposed on opposite external surfaces of the body in a length direction of the body; and the internal electrode includes a plurality of first and second internal electrodes alternately laminated in a thickness direction of the body and respectively connected to the first and second external electrodes.

12. The ceramic electronic component of claim 1, wherein a thickness of the first dielectric layer is 0.4 μm or less.

13. The ceramic electronic component of claim 1, wherein the tin (Sn) and dysprosium (Dy) are included in a central portion of the first dielectric layer in a thickness direction.

14. The ceramic electronic component of claim 1, wherein the second dielectric layer includes a smaller concentration of tin (Sn) than the first dielectric layer.

15. A ceramic electronic component comprising:

a body including an active portion, including a first dielectric layer and an internal electrode, and a margin portion disposed on a side surface of the active portion in a width direction of the body and including a second dielectric layer; and an external electrode disposed on the body and connected to the internal electrode, wherein:

each of the first and second dielectric layers includes a barium titanate-based material as a main component;

the first dielectric layer includes 0.5 mole to 1.5 moles of tin (Sn) and 0.6 mole to 1.0 mole of dysprosium (Dy) per 100 moles of the barium titanate-based material;

the second dielectric layer includes 1.5 mole to 2.5 moles of magnesium (Mg) per 100 moles of the barium titanate-based material;

the first dielectric layer includes a smaller concentration of Mg than the second dielectric layer; and the second dielectric layer includes a smaller concentration of at least one of tin (Sn) or dysprosium (Dy) than the first dielectric layer.

16. The ceramic electronic component of claim 15, wherein:

a molar ratio of dysprosium (Dy) and tin (Sn) (Dy/Sn) is 0.6 to 1.0.

17. The ceramic electronic component of claim 15, wherein a thickness of the first dielectric layer is 0.4 μm or less.

18. The ceramic electronic component of claim 15, wherein the tin (Sn) and dysprosium (Dy) are included in a central portion of the first dielectric layer in a thickness direction.

19. The ceramic electronic component of claim 15, wherein the second dielectric layer includes a smaller concentration of tin (Sn) and dysprosium (Dy) than the first dielectric layer.

* * * * *